Sept. 18, 1951 W. A. CLARK 2,568,055
CUSHION ASSEMBLY WITH AUXILIARY REINFORCING SPRING
Filed Jan. 5, 1948 9 Sheets-Sheet 1

INVENTOR.
William A. Clark
BY
Attorney.

Sept. 18, 1951 W. A. CLARK 2,568,055
CUSHION ASSEMBLY WITH AUXILIARY REINFORCING SPRING
Filed Jan. 5, 1948 9 Sheets-Sheet 2

INVENTOR.
William A. Clark
BY
Attorney.

Sept. 18, 1951 W. A. CLARK 2,568,055
CUSHION ASSEMBLY WITH AUXILIARY REINFORCING SPRING
Filed Jan. 5, 1948 9 Sheets-Sheet 4

INVENTOR.
William A. Clark
BY
Attorney

Sept. 18, 1951 W. A. CLARK 2,568,055
CUSHION ASSEMBLY WITH AUXILIARY REINFORCING SPRING
Filed Jan. 5, 1948 9 Sheets-Sheet 5

INVENTOR.
William A. Clark
BY

Attorney

Sept. 18, 1951  W. A. CLARK  2,568,055
CUSHION ASSEMBLY WITH AUXILIARY REINFORCING SPRING
Filed Jan. 5, 1948  9 Sheets-Sheet 6

INVENTOR.
William A. Clark
BY
Attorney.

Sept. 18, 1951 W. A. CLARK 2,568,055
CUSHION ASSEMBLY WITH AUXILIARY REINFORCING SPRING
Filed Jan. 5, 1948 9 Sheets-Sheet 7

FIG. 12

INVENTOR.
William A. Clark
BY
Attorney.

Sept. 18, 1951 W. A. CLARK 2,568,055
CUSHION ASSEMBLY WITH AUXILIARY REINFORCING SPRING
Filed Jan. 5, 1948 9 Sheets-Sheet 8

INVENTOR.
William A. Clark
BY

Attorney.

Sept. 18, 1951 W. A. CLARK 2,568,055
CUSHION ASSEMBLY WITH AUXILIARY REINFORCING SPRING
Filed Jan. 5, 1948 9 Sheets-Sheet 9

INVENTOR.
William A. Clark
BY
Attorney.

Patented Sept. 18, 1951

2,568,055

UNITED STATES PATENT OFFICE 2,568,055

CUSHION ASSEMBLY WITH AUXILIARY REINFORCING SPRING

William A. Clark, Detroit, Mich., assignor to L. A. Young Spring & Wire Company, Detroit, Mich.

Application January 5, 1948, Serial No. 508

7 Claims. (Cl. 155—179)

This invention relates to improvements in spring cushion structures and spring assemblies therefor.

The main objects of this invention are:

First, to provide a spring cushion structure well adapted for use in the seat and back cushions of motor vehicles, but also adapted for embodiment in various types of furniture which may be produced to meet the average requirements as to springiness or resilience but may be readily modified to meet the needs or requirements of persons above average weight or requiring a less yielding support for any reason.

Second, to provide a spring assembly having these advantages into which auxiliary or supplemental springs may be introduced and mounted at the desired location after the upholstery has been applied without disassembly of the same and without injury to the upholstery.

Third, to provide a structure having these advantages in which relatively soft or yielding spring supports may be supplemented by the introduction of auxiliary spring elements positioned to meet the requirements of the particular customer or user without the necessity of returning the structure to the factory and without the aid of a skilled upholsterer.

Fourth, to provide a spring cushion structure embodying these advantages and permitting adaptation or embodiment in spring structures made up of spring elements of different types, such as so-called conventional helically coiled spring elements or pocketed spring elements.

Fifth, to provide a spring structure having these advantages which may be economically produced and at the same time has the desired strength and rigidity.

Sixth, to provide a spring structure in which the main spring elements are uniform in character and in strength, and may be relatively yieldable to meet the requirements of light weight persons for one portion of the structure and provided with auxiliary springs to meet the requirements of a heavier person or a light weight person, thereby providing a spring cushion structure, one portion of which may be yielding to be suitable for a light weight person and another portion relatively less yielding to be suitable for a heavier person.

Seventh, to provide a spring cushion back structure which may be readily adapted for the needs of the user, one portion thereof such for instance as the shoulder supporting portion being suitably yielding, and the portion supporting the small of the back made less yielding to effectively support the back of the user.

Eighth, to provide a spring structure which can be restored to original contours after it has become distorted as a result of use.

Ninth, to provide a spring structure which may be adjusted or adapted to the needs of a short person above average weight to support him in position for proper vision from an automobile.

Other objects and advantages relating to details and economies of my invention will definitely appear from the description to follow. The invention is defined in the claims.

A structure which embodies the features of the invention is clearly illustrated in the accompanying drawing, in which.

In the accompanying drawing 1 represents an automobile provided with a seat cushion designated generally by the numeral 2 and a back cushion designated generally by the numeral 3. It is a matter of common knowledge and experience that seat and back cushions are designed to meet average requirements, that is, for persons of average weight and height. The result is that heavy persons are not properly supported, and if the occupant is short and heavy he is not supported in proper position for driving the automobile. The same may be true of the tall heavy person, although his vision may be less disturbed. It is also a matter of common knowledge that extensively used cushions sag on displacement of the upholstery padding material thereby lowering the position of the occupant so that his vision is not the same as from the original seat and rendering the cushion uncomfortable.

Attempts have been made to remedy these conditions by making cushions with a double set of springs, or double-deck springs as they are sometimes called, having a light top topper portion and a heavier bottom portion. Such springs were expensive and usually resulted in a high spring, whereas, the present requirements are for relatively low spring cushions with the desired resilience.

By my invention I am able to meet all of these conditions or requirements in a highly satisfactory and economical manner, permitting the manufacture of spring structures according to specifications and the adaptation thereof to meet varying conditions as I have pointed out.

Figures 6, 7:
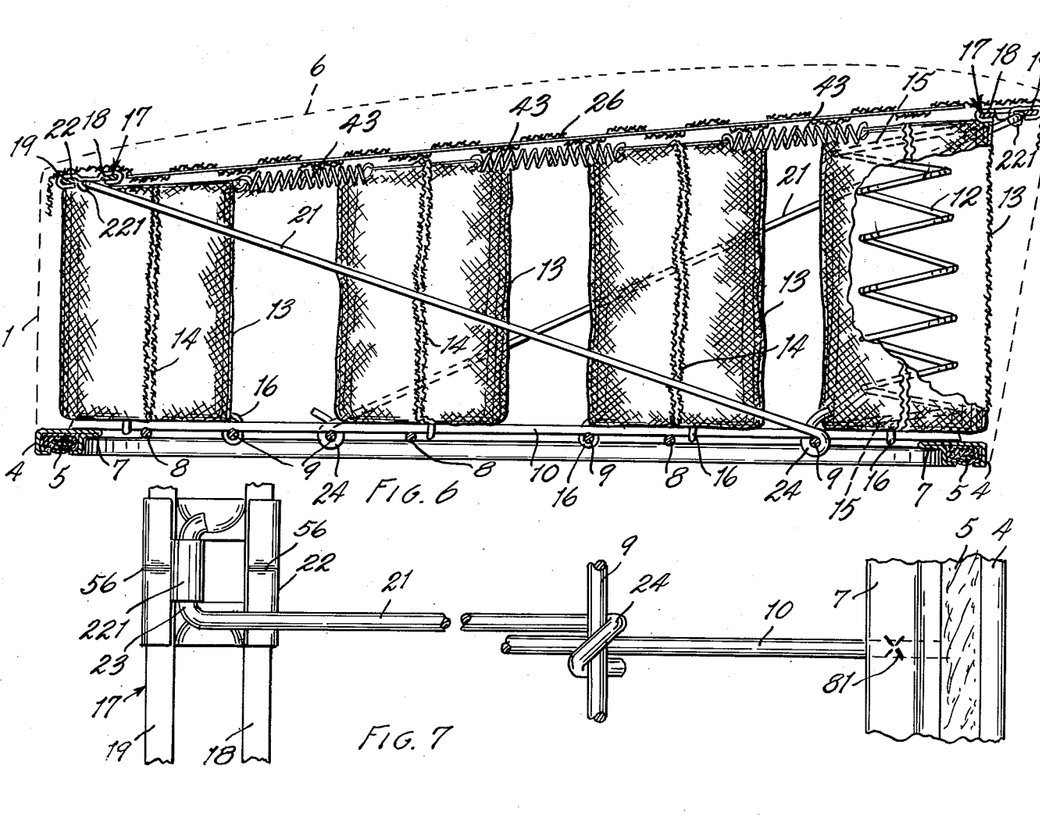
Fig. 6 is an enlarged fragmentary view partially in section on line 6—6 of Fig. 3.
Fig. 7 is an enlarged fragmentary bottom view illustrating structural details of the bracing features.

Referring now to the embodiment of the invention shown in Figs. 3 to 9, inclusive, the structure there illustrated comprises a base rim 4 of the tacking insert type, the rim being generally of downwardly facing channel section having a tacking insert 5 to which the upholstery 6, designated by dotted lines in Fig. 6, is secured. This rim has an inwardly projecting flange 7 to which the longitudinal supporting bars 8 in the form of heavy wire or light rod of suitable gauge are secured by means of the welds as indicated at 81 in Fig. 4. Supplemental longitudinal bars 9 are disposed parallel to the bars 8, primarily providing proper anchorage and support although they serve as base or foundation elements. The transverse rods or wires 10 are arranged in spaced relation above the rods 8 and 9 and welded thereto at the crossing points as indicated at 11 in Fig. 5. The ends of the cross rods 10 are secured to the flanges 7 of the border frame. This provides a rigid grid-like supporting structure for the springs which in the embodiment illustrated are of the pocketed type, the springs 12 being of the so-called cylindrical type arranged in pockets 13. The pockets of the rows of springs are connected at 14. In this embodiment the end coils 15 of the springs 12 are enlarged as compared with the body coils; this supports the pockets so that they do not rub or become interlocked with the intermediate coils of the springs.

Figure 8:
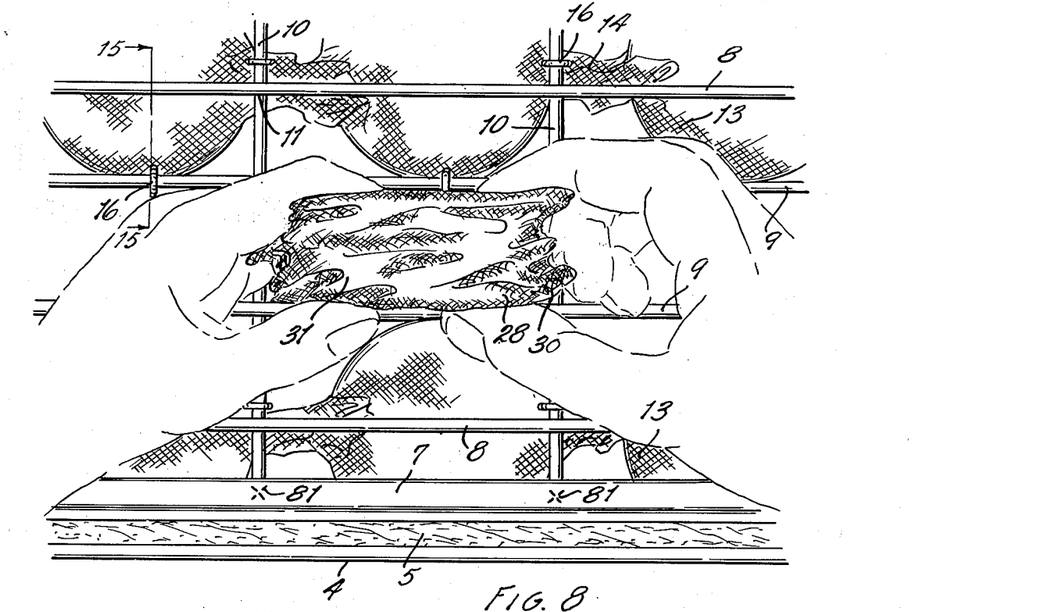
Fig. 8 is a fragmentary inverted view illustrating one of the steps of introducing an auxiliary or supplemental spring into the spring structure.
Figures 9, 15, 16:
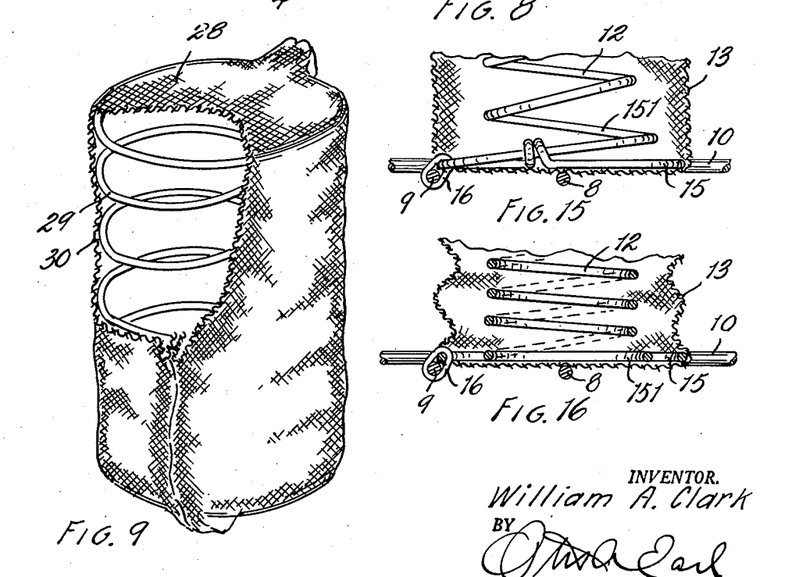
Fig. 9 is a perspective view of one of the auxiliary springs of the pocketed type, a portion of the casing being broken away.
Fig. 15 is a fragmentary vertical section on a line corresponding to line 15—15 of Fig. 8 illustrating the relation of one of the main body springs to the bottom bars 8.
Fig. 16 is a fragmentary view partially in section of the parts shown in Fig. 15 with the spring compressed or partially compressed further illustrating the supporting relation of the bars 8 to the springs.

These strips of pocketed springs are arranged longitudinally of the structure, the front and rear rows or strips of springs being arranged to overlap the front and rear portions of the bottom frame. The inner sides of these front and rear rows are secured to the adjacent longitudinal rods 9. The longitudinal rods 8 are arranged centrally below the intermediate rows and the rear row of pocketed springs. Certain of the longitudinal rods 9 are arranged so that the bottom coils of the springs may be secured thereto by the clips 16, commonly designated "hog rings." These wire clips are of such dimensions as to be clamped around the rods 9 and the bottom coils of the springs through the pockets. The springs are also secured to the transverse rods 10 by means of clips 16. It will be noted that the springs are so arranged that they are directly supported by the longitudinal rods or bars 8, the front and rear rows of springs being additionally supported by the frame as shown in Fig. 6. This arrangement of the base bars in which the springs are mounted directly above the bars 8 substantially minimizes in material and at the same time, the springs are effectively supported. In this connection attention is directed to Figs. 8 and 15 and 16. Fig. 15 is a view illustrating the relation of the bottom coils to the bars 8 when the springs are not under compression or under load. When under compression or load the coils of the springs are collapsed as shown in Fig. 16 but the bars prevent the coils of the springs passing through the bottom frame, that is, the smaller coils are supported by the bars 8 and cannot pass through the bottom of the cushion. The intermediate coils of the spring 12 are designated by the numeral 151 and it will be noted that in Fig. 16 the intermediate coil is collapsed upon the rod 8 so that the rod 8 not only supports the outer coil which is normally larger than the intermediate coils but also the intermediate coils. This results in a safer spring and also enables the use of a smaller diameter coil spring wire giving a softer initial feel yet supporting as much load as a heavier spring in which the intermediate coils are not supported as by the rods or bars 8 so that there is a double advantage of enabling the use of less stock in the springs as well as in the base structure.

Figure 3:
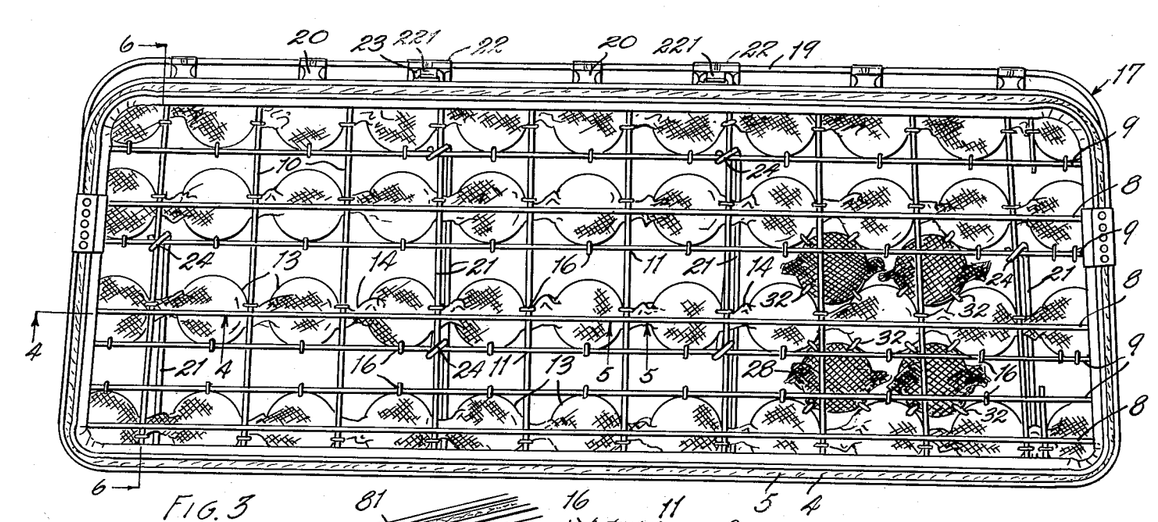
Fig. 3 is an inverted or bottom view of a seat cushion embodying my invention, the main springs being of the pocketed type. The structure illustrated is equipped with four auxiliary or supplemental springs.

The top border frame 17 comprises spaced inner and outer frame members 18 and 19 connected at spaced intervals by struts 20, this being an adaptation of the Asaro Patent No. 2,336,975, granted December 14, 1943. It is quite essential that the top frame be braced to prevent swaying and tilting of the main body springs, and to this end I provide braces 21 which are secured to certain of the struts 22 by means of tongues 221 formed integrally therewith. The upper ends of the braces have laterally offset arms 23 engaged by these tongues 221. The lower ends of the braces are provided with spiral coils 24 which are engaged with longitudinal members and with cross members at their crossing points as shown in Fig. 3.

The upholstery 6 consists of a suitable padding 25 arranged on a supporting sheet 26 preferably reinforced by a plurality of resilient wire strands and covered by the covering 27 which is secured to the bottom border frame by means of tacks when the border frame is of the type shown in the structure now being described. This structure as described constitutes the regular installation; as stated, it is made according to specifications so far as the supporting capacity of the springs is concerned, and it would in most cases constitute a normal installation as delivered with the motor vehicle.

The particular arrangement of the parts of the spring supporting base, and of the braces and the arrangement of the springs relative to these parts is part of my invention and is important, both in the effective supporting of the springs and the bracing. The structure is very economical, both in material used and in assembly when considered in relation to the desirability of the finished product. As pointed out, spring cushions of this character are of necessity designed to provide suitable support for the average sized person. It is not commercially practical to provide complete spring structures which would be most suitable for persons of certain weight or height. By my invention I am able to adapt the structure to accommodate and effectively support persons of weight above and below the contemplated average, both tall and short, and to repair worn or sunken cushions without removing the upholstery, the structure being such that the automobile dealer, if supplied with the proper parts, can arrange them to meet the requirements of the particular customer or user or can repair a sunken cushion.

I accomplish this by providing auxiliary spring units 28 preferably consisting of a cylindrical coiled spring 29 encased in a pocket 30. The bottom structure which I have described has the parts arranged so that these spring units can be collapsed as shown at 31 in Fig. 8 and passed between adjacent longitudinal and transverse bottom bars, one step of the method being illustrated in Fig. 8. After the unit 28 is passed between the bottom members it is turned horizontally and released, and manipulated to proper position between springs of adjacent rows as shown in Fig. 3 where there are four of the auxiliary springs. These auxiliary springs are then positioned above supporting bars, desirably both transverse and longitudinal, and are in the preferred embodiment secured to adjacent main body springs by means of clips 32. In Fig. 3 each of the auxiliary or supplemental springs is secured by four clips but the main load on the auxiliary springs is sustained by the supporting grid. The auxiliary springs thus arranged are supported in upright position between adjacent main springs. While I have illustrated in Fig. 3 only four of the auxiliary springs, it will be understood that any desired number can be used and that they can be positioned, either on the driver's side, on the other side, or as desired.

Figure 2:
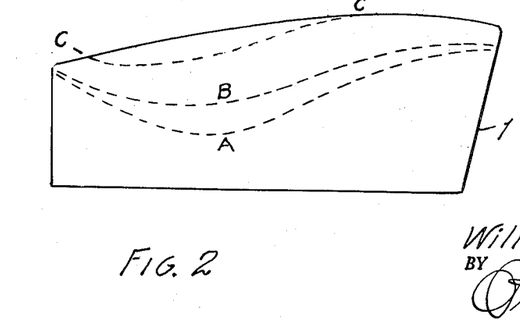
Fig. 2 is a conventional end elevation of a seat cushion, the dotted lines A illustrate the approximate line of deflection for a person of normal height and weight without auxiliary springs or a normal height heavy weight with the auxiliary springs, the line B indicating a cushion adapted to support a short light weight person without auxiliary springs or a short heavy weight with auxiliary springs, and line C—C a cushion in which the upholstery has been deformed by use and which it may be desired to support in original position.
Figure 3A:
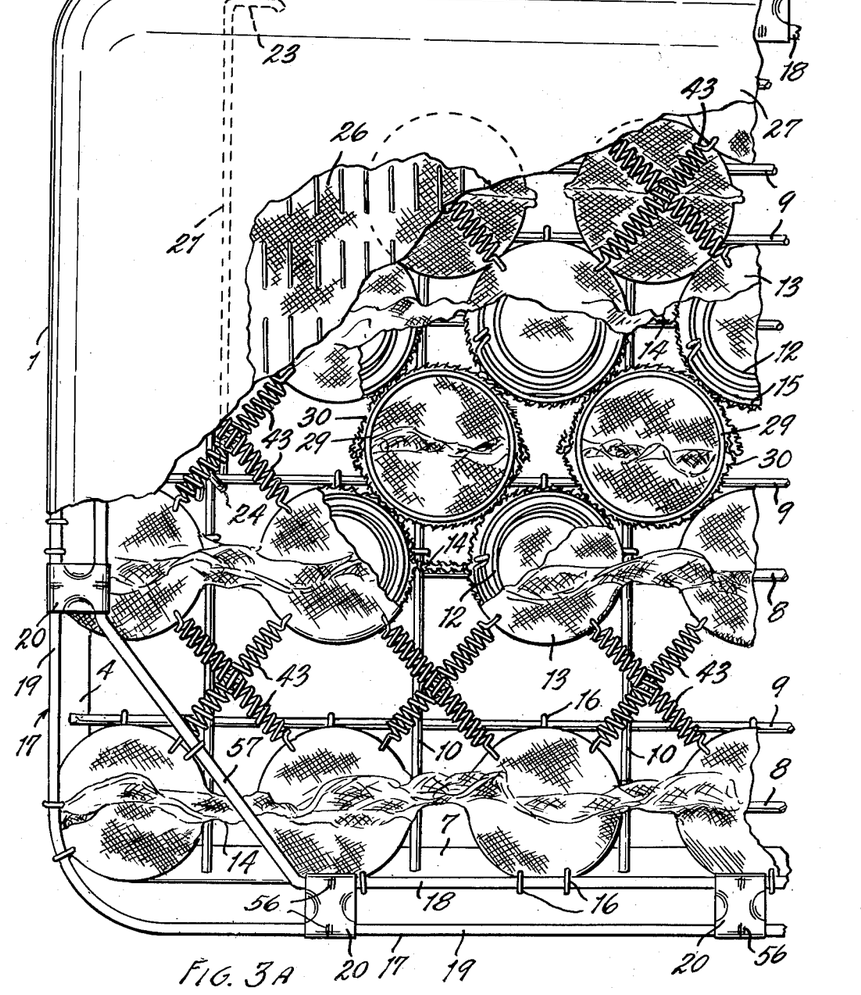
Fig. 3A is an enlarged fragmentary top plan view of the right hand portion of Fig. 3, the upholstery being partially broken away and with portions of the main body and auxiliary springs in section to illustrate the relationship of the auxiliary or supplemental springs to other parts of the structure.
Figure 4:
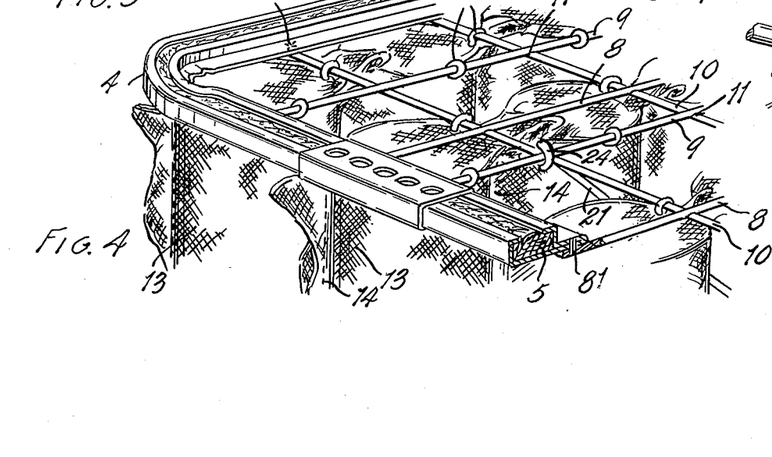
Fig. 4 is an enlarged fragmentary perspective view partially in section on a line corresponding to line 4—4 in Fig. 3 illustrating further structural details.
Figure 5:
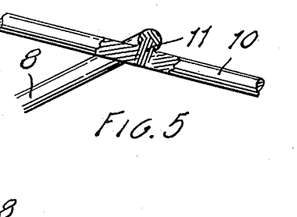
Fig. 5 is an enlarged fragmentary perspective view partially in section on line 5—5 of Fig. 3.
Figure 17:
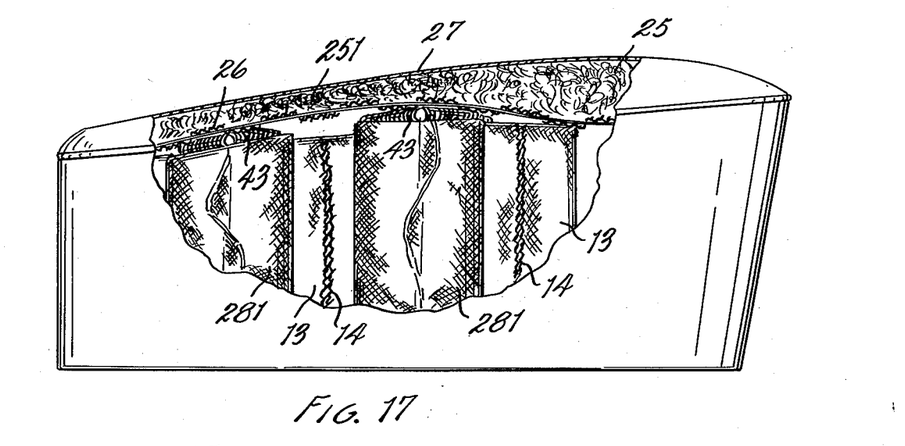
Fig. 17 is an end elevational view partially broken away and partially in section illustrating the cooperating relation of the auxiliary springs to the upholstery which has been restored by the introduction of the auxiliary springs after it had been displaced by use.

In the event the cushion has sagged, from the displacement of the padding as indicated by dotted line C—C in Fig. 2, auxiliary or supplemental springs 281 may be inserted to lift this distorted portion 251 to approximately its initial position. (See Fig. 17.) This is particularly advantageous where the inner covering 26 is a wire reinforced mat such as indicated in Fig. 3A. These auxiliary springs 281 are of such length as to perform this function. Further, where the auxiliary springs are designed to adapt the cushion to a normal height, heavy weight person the auxiliary springs are of such character as to support him on the line A—A of Fig. 2, and for a short heavy weight person the auxiliary springs are of such height and tension as to support the occupant on the line B—B of Fig. 2. The structure is the same for all of these conditions other than for the matter of length and tension of the springs. These conditions are mentioned to show the wide range of adaptability.

Figure 10:
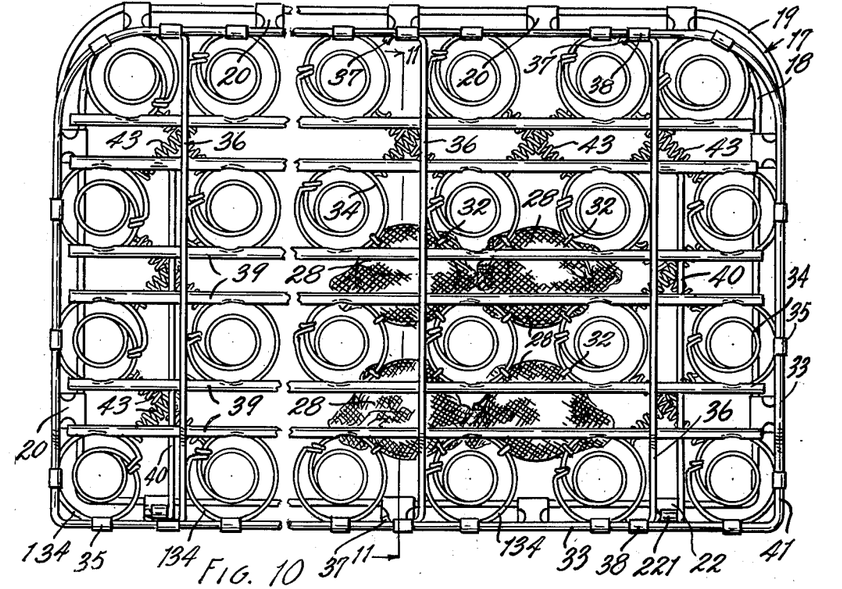
Fig. 10 is a fragmentary bottom view of a modified form or embodiment of my invention employing so-called conventional helical main body springs.
Figure 11:
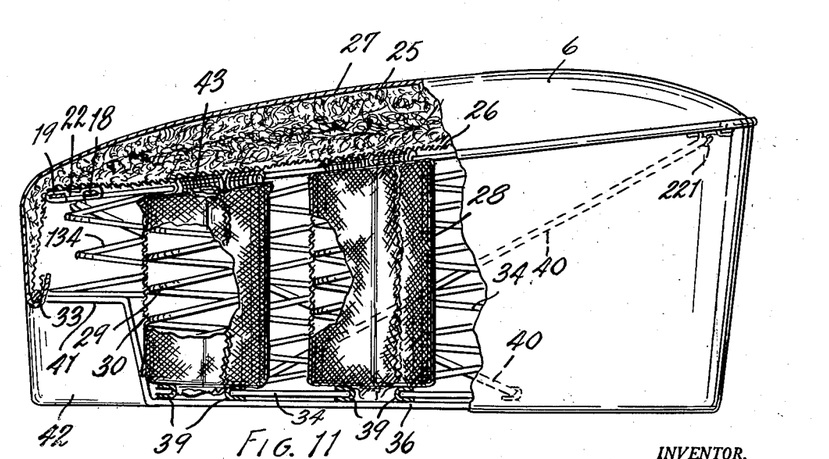
Fig. 11 is a fragmentary view partially in section on a line corresponding to line 11—11 of Fig. 10 illustrating the auxiliary or supplemental springs in their relation to the conventional helical springs of Fig. 10.

In Figs. 10 and 11 I show another embodiment or adaptation of my invention, primarily an adaptation to the helically coiled unpocketed type of spring. In this embodiment the wire base border frame 33 is provided, and the border body springs 34 are secured thereto by clips 35. The cross bars 36 are provided with laterally turned ends 37 secured to the border frame by clips 38. The spring supporting U-shaped bars 39 are clamped upon the bottom coils of adjacent springs. These U-shaped bars 39 are conventional, and they are arranged to permit auxiliary spring units 28 to be passed through the bottom frame and arranged to be supported by spring supporting bars thereof as shown in Figs. 10 and 11. The auxiliary or supplemental springs are secured by means of clips 32 desirably to the four adjacent springs. However, the load on the auxiliary or supplemental springs is carried by the supports on which they are arranged. The top border frame 17 is the same as that previously described, the braces 40 being secured at their inner ends to certain of the bars 39 by clamping within the channels thereof. They are secured at their upper ends by the tongues 221 on the struts 22.

In the embodiment shown in Figs. 10 and 11 the rear portion 41 of the base frame is upwardly offset as shown in Fig. 11. This structure is especially designed for use as the front seat in an automobile and the offset provides a toe recess 42, see Fig. 11. This necessitates that the rear row of springs 134 should be shorter than the other springs and consequently it may be important even as the seat is initially constructed to insert the rear auxiliary springs. In that case it might be desirable to extend these springs entirely across the seat structure; I have illustrated only a pair of them.

When using this type of springs they are desirably connected at their upper ends by the cross helicals 43 and the auxiliary springs are positioned directly under these cross helicals, thereby providing an effective support for the mat 26 arranged on top of the springs. While the helical tie members are resilient, the wire reinforced mat receives the thrust through the helical tie members and distributes over a substantial area while permitting the upholstery to yield.

Figure 12:
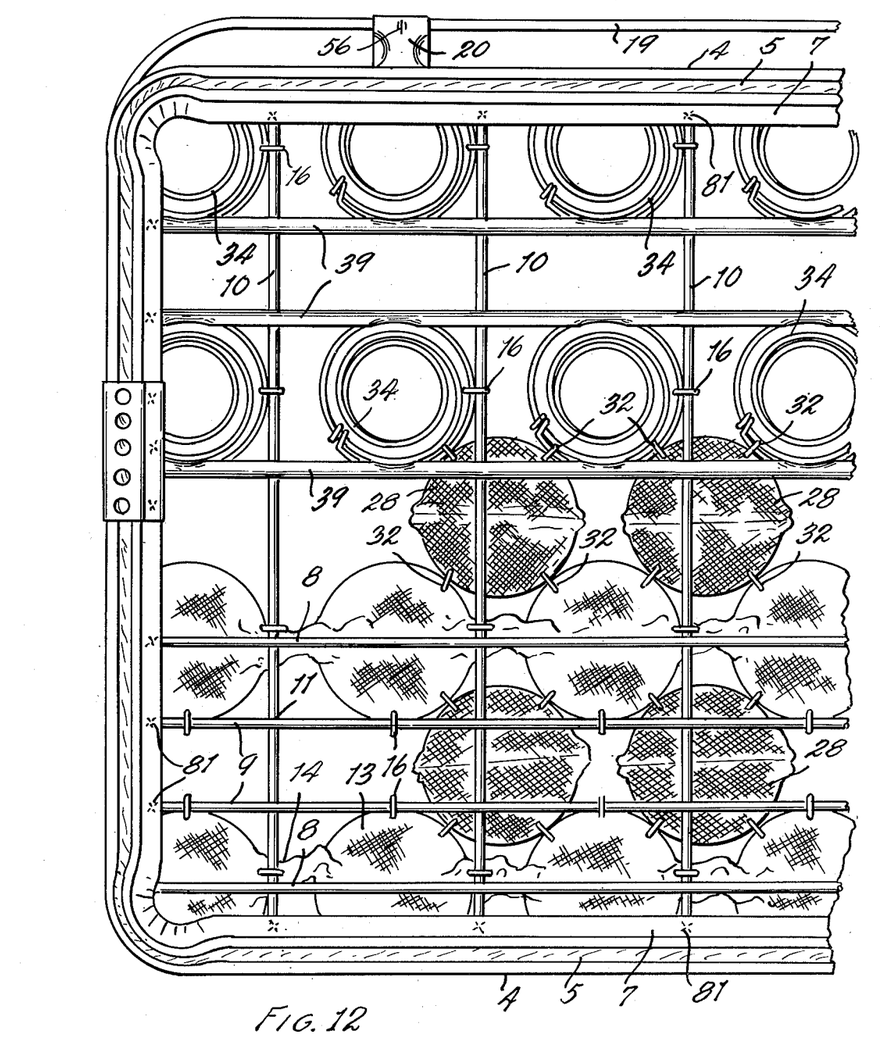
Fig. 12 is a fragmentary bottom view of still another embodiment or adaptation of my invention in which the main springs are partially of the helical type and partially of the pocketed type, the structure being equipped with supplemental springs.

In the embodiment of my invention shown in Fig. 12 I provide a structure in which the front rows of springs are of the conventional coiled type, whereas, the rear rows of springs 13 are of the pocketed type. This structure is provided with the tacking insert type of bottom border frame having longitudinal bars 8 and 9 secured thereto. The bars 8 are directly under the rows of springs and ths bars 9 are positioned to receive the clips 16 by which the springs are secured in position against shifting. The two front rows of springs 34 are supported by the channel-shaped cross members 39, the front border springs also resting upon the front member of the base frame. The supplemental or auxiliary spring units 28 are inserted through the bottom and disposed upon the frame longitudinal and cross members and secured in position between adjacent main body springs by the clips 32. The helical body springs 34 are secured to the cross bottom members 10 by means of clips 16. The braces are not illustrated in Fig. 12.

Figure 13:
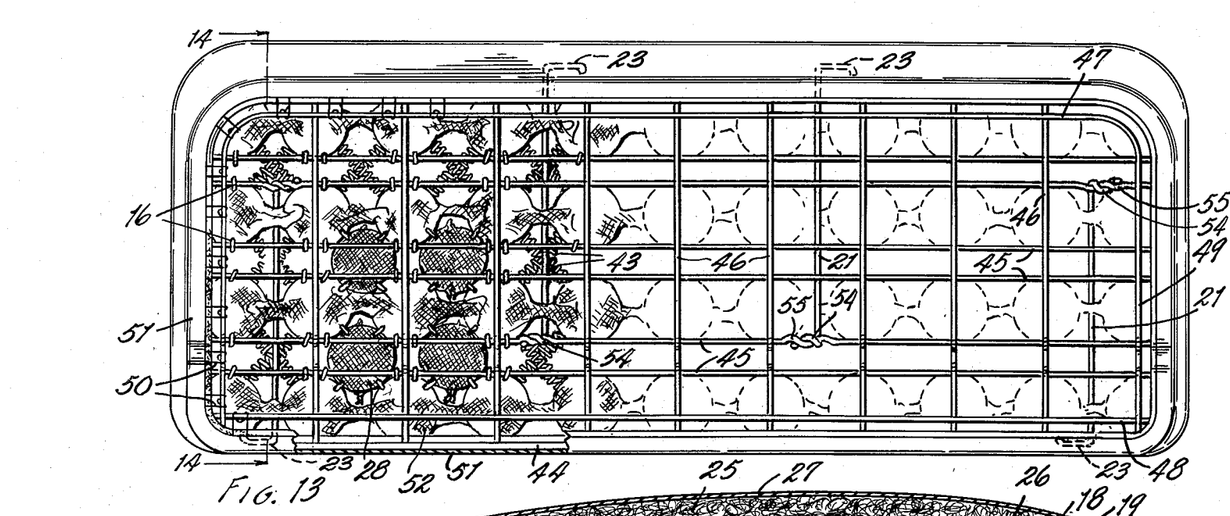
Fig. 13 is an inverted view of a modified form or embodiment of my invention which lacks some of the advantages of the preferred embodiment as shown in Fig. 3 but having other advantages primarily in the matter of rim structure and attachment of the upholstery.
Figure 14:
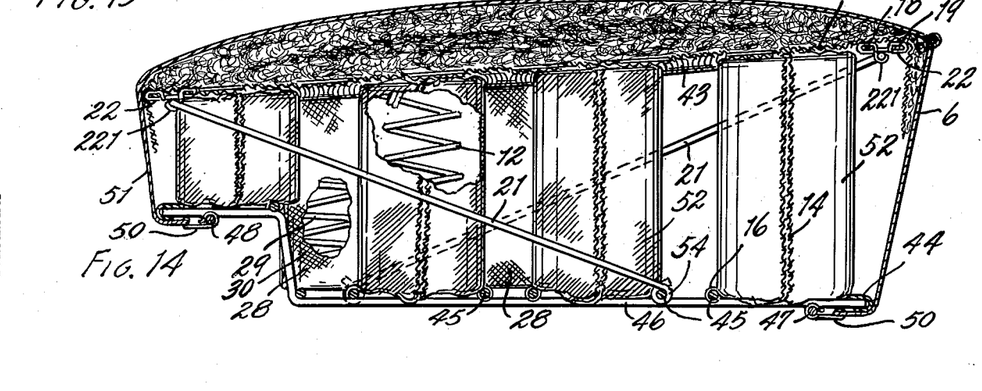
Fig. 14 is an enlarged fragmentary view mainly in vertical section on line 14—14 of Fig. 13.

In the embodiment illustrated in Figs. 13 and 14 the border frame 44 is of inwardly facing U section as best shown in Fig. 14 and has longitudinal supporting bars 45 secured thereto in spaced pairs. These bars are further supported by the cross bottom bars 46 forming a supporting grid, the ends of the bars being clamped within the U border frame and also welded therein.

To facilitate the attachment of the upholstery, upholstery securing rods 47 and 48 are arranged in spaced relation to the border frame. These rods are adapted to be engaged by the hooks 50 secured to the edge of the upholstery covering 51. The main body springs designated generally by the numeral 52 are of the pocketed strip assembly type and are secured in rows by the clips 16 in supported relation to the bottom grid. The members of this bottom grid are spaced to permit the insertion of the auxiliary spring unit 28 when they are collapsed and presented thereto as shown in Fig. 8, the auxiliary springs being turned and supported between adjacent main body springs by clips as indicated at 16. It will be noted that the clips 16 attaching the springs to the longitudinal grid wires are arranged in pairs, one on either side of the cross strips 46. In the preferred embodiment the clips connecting the main body springs to the longitudinal wires or supporting bars prevent shifting of the springs from front to rear, while the clips securing the springs to the transverse grid members prevent shifting longitudinally of the seat so that by arranging the longitudinal and cross piece or grid members as shown in the preferred embodiment a very substantial saving is effected in the matter of the number of clips required and consequently in the time required for applying them. In some cushions the clips can be omitted as the auxiliary springs will be effectively supported by the underlying face portions and the adjacent main body springs.

The structure shown in Fig. 14 is of the type having the upwardly offset rear portion to provide toe room as previously explained, and the auxiliary springs adjacent the rear thereof perform an important function of supplementing the short rear springs. In this embodiment the braces 21 are provided with laterally turned ends 23 which are secured to the top border frame as has been described. However, the lower ends of these springs terminate in spiral coils 54 which are engaged with double offsets 55 in certain of the longitudinal members of the base frame. In the preferred embodiment the spiral terminals of the braces are engaged with certain of the longitudinal base members 9 and transverse base members 10 at their crossing point as is best illustrated in Fig. 7. It will be noted that the spiral end portions 24 of the braces 21 are disposed at one side of the brace while the terminal arms 23, engaged by the tongues 221, are disposed in the opposite direction. This results in a bracing action, the spiral at one end bracing in one direction while the arms 23 brace in the opposite direction.

The frame member clips or trusses 20 are secured against longitudinal movement on the border frame members by the indentations 56 which prevent longitudinal movement of the struts 22 relative to the inner and outer border members 18 and 19. This provides a very rigid top border frame, that is, it resists edgewise thrust but at the same time is comparatively light in weight and is supported for vertical movement by the spring assemblies described.

In the preferred embodiment as best shown in Fig. 3A the inner top border member 18 has diagonal corner portions 57 which serve as braces stiffening the frame at the corners where it is subject to considerable stress. This type of top border frame, which strongly resists inward collapsing, is particularly desirable in that it also permits the use of a minimum of braces which, as stated, are primarily designed to prevent swaying movement of the top portion of the cushion structure relative to the base.

Figures 18, 19:
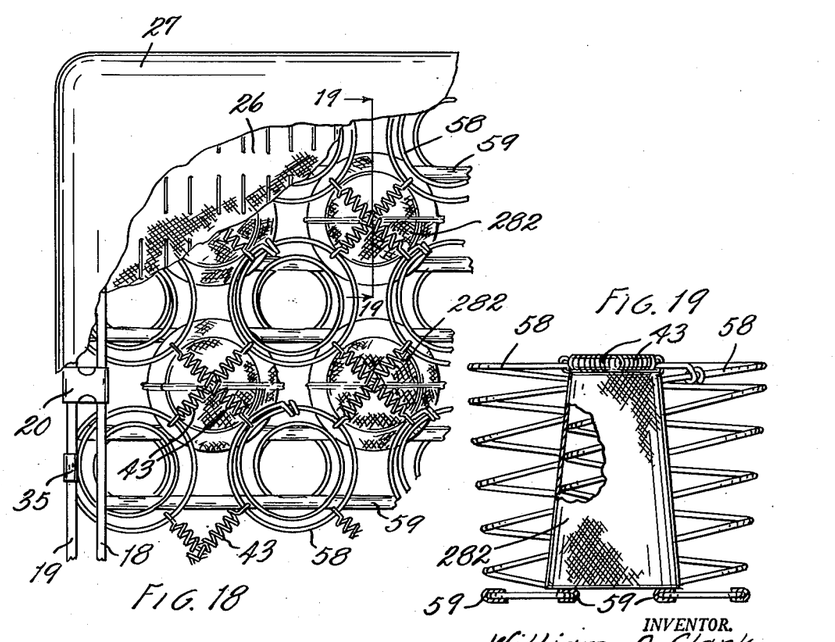
Fig. 18 is a fragmentary plan view of another embodiment of the invention in which conventional cone type springs are employed, connected at their tops by cross tie members.
Fig. 19 is an enlarged fragmentary view in section on line 19—19 of Fig. 18.

In the embodiment of my invention shown in Figs. 18 and 19 the main body springs 58 are of the conical type as distinguished from the hourglass type shown in Figs. 10 and 11, for example. These conical springs are arranged with their small ends downward, their upper ends being connected by the cross helicals 43. The auxiliary or supplemental springs 282 are of the conical type with their small ends arranged upwardly. They are provided with fabric casings or pockets as in the embodiment shown in Fig. 9. In this embodiment the bottom coils of the springs are engaged in the U-shaped supports 59 as best shown in Fig. 19. These pairs of supports are spaced so that the supplemental springs 282 may be introduced by collapsing and pressing edgewise between the pairs of spring supports. They are then turned as in the other embodiments to an upright position between the main body springs, see Fig. 18 where the relation of the supplemental springs to the main body springs is clearly illustrated.

In all of these embodiments I preferably employ the wire reinforced upholstery supporting mat best shown in Fig. 3A. This mat is conventionally shown in most of the embodiments but it should be understood that it is an important factor in that it provides an effective upholstery support, supported by the main body springs and also the auxiliary springs, thus rendering the auxiliary springs highly effective.

Figure 1:
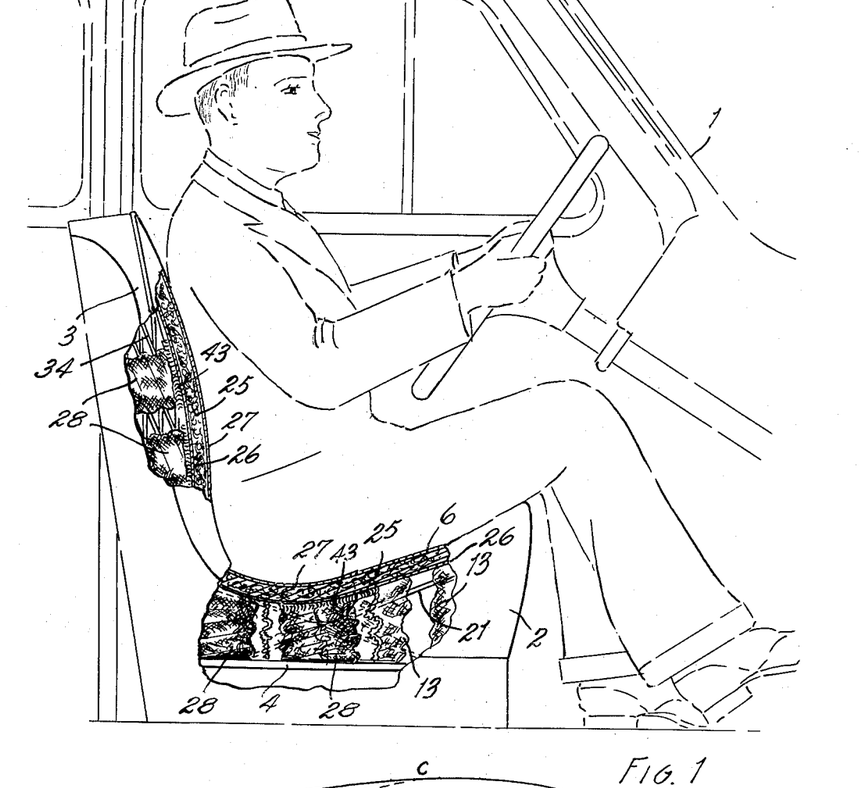
Fig. 1 is an end elevational view of a motor vehicle seat cushion and back embodying my invention, parts being broken away to show structural details, fragments of an automobile being indicated by dotted lines, and an occupant being indicated to show the relation of the parts.

As illustrated in Fig. 1, my invention is also desirably embodied in the back cushion associated with seat cushions having my invention embodied therein. This enables the back cushion to be adapted to properly support the back of the user, ordinarily the small of the back being the part which should have additional spring resistance. This not only readily adapts the structure to accommodate persons of various weights and heights, but results in furthering proper posture of the user which is particularly desirable where used for considerable periods and is of course, desirable for even short periods of use.

I have illustrated these several embodiments or adaptations of my invention to enable those skilled in the art to practice the invention as may be required for particular conditions.

Having thus described my invention what I claim as new and desire to secure by Letters Patent is:

1. The method of increasing the supporting capacity of a preformed cushion structure or the like, comprising a spring supporting base including spaced spring supporting bars, spaced symmetrically disposed main springs supported on said base and secured thereto, an outer flexible cover disposed on said main springs and bridging the space between them, the method comprising introducing into a space between main body springs at least one auxiliary spring by collapsing said auxiliary spring and inserting the same sidewise between adjacent supporting bars into said space, then turning the spring and releasing the same to permit it to expand from the spring supporting base to the cover, and securing said auxiliary spring to said base.

2. A cushion or the like adaptable for varying service requirements, comprising a preformed spring structure built according to predetermined specifications to satisfy anticipated load conditions and including a base having spaced apart bars, a covering arranged over said spring structure, said spring structure including a plurality of main coil springs extending to said covering and supported on said base and so arranged as to leave a plurality of symmetrically disposed spaces extending from said base to said covering, each space being defined by a number of said springs and the distance across each space from one spring to the one diametrically opposite the same being equal to the diameter of each coil spring, and at least one auxiliary spring, each such spring being disposed in one of said spaces and extending from said base to said covering, each auxiliary spring having been introduced into the cushion structure subsequent to the completion thereof according to said predetermined specifications by passing the auxiliary spring sidewise between two of the base bars and into said space to be occupied thereby while in collapsed condition and prior to permitting expansion of the spring to fill said space.

3. A cushion or the like adaptable for varying service requirements, comprising a preformed spring stducture built to satisfy predetermined load conditions and including a base having spaced apart bars, a covering arranged over said spring structure, said spring structure including a plurality of main coil springs supported on said base and so arranged as to leave a plurality of symmetrically disposed spaces extending from said base to said covering, each space being defined by a number of said springs, and at least one auxiliary spring, each such spring being disposed in at least one of said spaces and extending from said base to said covering, said auxiliary spring having been introduced into the cushion structure subsequent to the completion thereof according to predetermined specifications by passing the auxiliary spring sidewise between two of the base bars and into said space to be occupied thereby while in collapsed condition and prior to permitting expansion of the spring to fill said space.

4. A cushion or the like adaptable for various service requirements comprising a preformed spring structure built to meet anticipated load conditions and including a base having spaced apart bars, a covering arranged over said spring structure and including an upholstery supporting mat comprising a flexible sheet of material having a plurality of resilient reinforcing wires incorporated therein, said spring structure including a plurality of main coil springs supportingly coacting with the said mat with the reinforcing wires extending across the tops of the springs and bridging the spaces between them, said main body springs being arranged on the base so as to leave a plurality of symmetrically disposed spaces extending from the base to said mat, said mat bridging the said spaces, each space being defined by a plurality of body springs, and at least one auxiliary spring, each such auxiliary spring being disposed in one of the spaces defind by the body springs and extending from said base to and in supporting relation to said mat, each auxiliary spring having been introduced into the cushion structure by passing the auxiliary spring sidewise between adjacent bars and into the space occupied thereby while in collapsed condition permitting expansion of the auxiliary spring into the space to which it is so introduced.

5. A cushion or the like adaptable for various service requirements comprising a preformed spring structure built to meet anticipated load conditions and including a base having spaced apart bars, a covering arranged over said spring structure, said spring structure including a plurality of pocketed main coil springs, said main body springs being arranged on the base so as to leave a plurality of symmetrically disposed spaces extending from the base to said mat, each space being defined by a plurality of body springs, and at least one pocketed auxiliary spring, each such auxiliary spring being disposed in one of the spaces defined by the body springs and extending from said base to each auxiliary spring sidewise between adjacent bars and into the space occupied thereby while in collapsed condition permitting expansion of the auxiliary spring into the space to which it is so introduced, the bottom coil of the auxiliary spring being connected to the bottom coils of the adjacent body springs defining the space in which the auxiliary coil is positioned.

6. A cushion or the like adaptable for various service requirements comprising a preformed spring structure built to meet anticipated load conditions and including a base having spaced apart bars, a covering arranged over said spring structure, said spring structure including a plurality of main coil springs and resilient connections for the top coils thereof, said body springs and resilient connections supportingly coacting with the covering, said main body springs being arranged on the base so as to leave a plurality of spaces below said resilient top coil connections and extending from the base to said covering, each space being defined by a plurality of body springs, and at least one auxiliary spring enclosed in a pocket, each auxiliary spring being disposed in one of the spaces defined by the body springs and extending from the base to and in supporting relation to said resilient top coil connections, each auxiliary spring having been introduced into the cushion structure by passing the auxiliary spring sidewise between adjacent bars and into the space occupied thereby while in collapsed condition permitting expansion of the auxiliary spring into the space to which it is so introduced, the bottom coil of the auxiliary spring being in supported relation to the base and being connected to the bottom coil of at least one adjacent body spring.

7. A cushion or the like adaptable for various service requirements comprising a preformed spring structure built to meet anticipated load conditions and including a base having spaced apart bars, a covering arranged over said spring structure, said spring structure including a plurality of main coil springs supportingly coacting with the covering, said main body springs being arranged on the base so as to leave a plurality of spaces extending from the base to said covering, each space being defined by a plurality of body springs, and at least one auxiliary spring enclosed in a pocket, each auxiliary spring being disposed in one of the spaces defined by the body springs and extending from the base to and in supporting relation to said covering, each auxiliary spring having been introduced into the cushion structure by passing the auxiliary spring sidewise between adjacent bars and into the space occupied thereby while in collapsed condition permitting expansion of the auxiliary spring into the space to which it is so introduced, the bottom coil of the auxiliary spring being in supported relation to the base.

WILLIAM A. CLARK.

REFERENCES CITED

The following references are of record in the file of this patent:

UNITED STATES PATENTS

| Number | Name | Date |
|---|---|---|
| Re. 18,860 | Costigan | June 6, 1933 |
| 999,816 | Wilbur | Aug. 8, 1911 |
| 1,192,510 | Fischmann | July 25, 1916 |
| 1,776,400 | Suekoff | Sept. 23, 1923 |
| 1,930,697 | Stewart | Oct. 17, 1933 |
| 1,963,670 | Nemmer et al. | June 19, 1934 |
| 2,264,607 | Asaro | Dec. 2, 1941 |
| 2,304,652 | Pudlo | Dec. 8, 1942 |
| 2,320,153 | Moske | May 25, 1943 |
| 2,334,305 | Asaro | Nov. 16, 1943 |
| 2,336,975 | Asaro | Dec. 14, 1943 |